Figure 1:
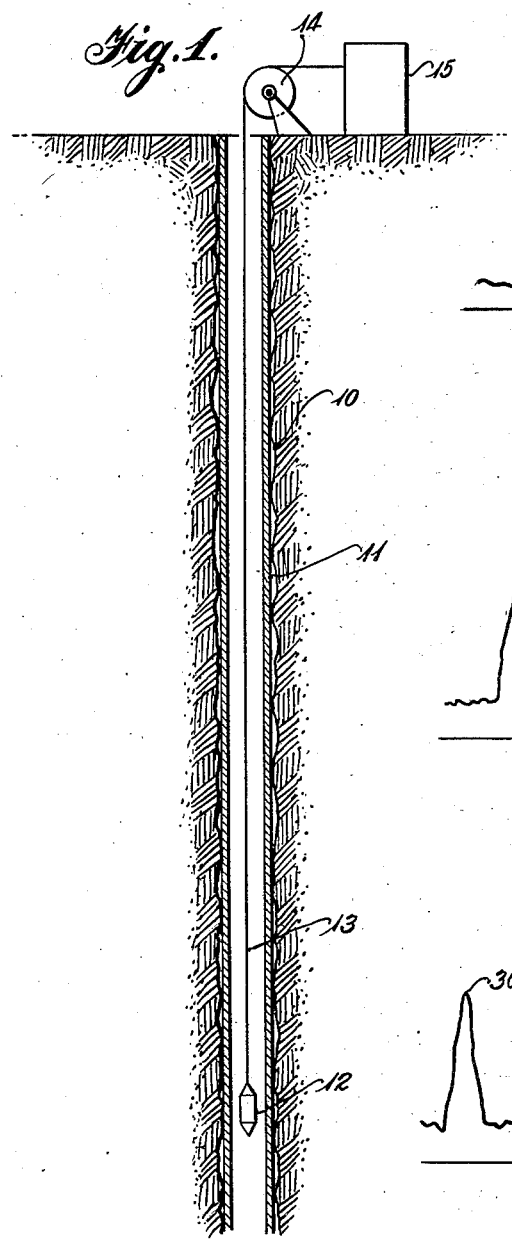

June 1, 1943.  W. L. RUSSELL  2,320,890
METHOD OF GEOPHYSICAL PROSPECTING
Filed Aug. 2, 1941

Inventor
William L. Russell
By Stevens and Davis
Attorneys

UNITED STATES PATENT OFFICE 2,320,890

METHOD OF GEOPHYSICAL PROSPECTING

William L. Russell, Tulsa, Okla., assignor to Well Surveys, Incorporated, Tulsa, Okla., a corporation of Delaware Application August 2, 1941, Serial No. 405,269

2 Claims. (Cl. 250—33.6)

This invention pertains generally to improvements in methods of geophysical prospecting and more particularly is concerned with a novel method for determining the location, especially the depth, of subterranean strata.

The now greatly increased importance of petroleum and kindred deposits occurring in subterranean geological formations has given new impetus to geophysical prospecting, especially to those methods of prospecting wherein the character of strata surrounding a well bore or similar earth opening is determined by movement of a testing instrument therein. In methods of prospecting of this type, a log is obtained which indicates the results of tests made with the instrument correlated with measurements of the location of the instrument when the tests were made. When performing these operations, the testing instrument usually is suspended upon a metallic cable which serves both to support the instrument within the well and to provide a method for indicating its approximate location therein. A measuring drum, located at the mouth of the well and over which the cable is passed, permits continuous measurement of the length of cable within the well for the purpose of indicating the depth at which the instrument is located. Although this method of locating the position of the instrument is satisfactory for use when the instrument is near the surface, it is not suited for use in the prospecting of deep wells because of stretching of the cable due to the weight of the long length of cable within the well and the added weight of the instrument, which thus vitiates the attempted measurements of instrument location. In addition to these difficulties encountered in geophysical prospecting, measurement errors due to cable stretch also arise in the use of cable suspended perforating equipment, causing in some instances perforation of a stratum containing water instead of a neighboring stratum containing oil.

The value of geophysical logs is greatly reduced unless they can be accurately compared on the one hand with the measurements and logs of the operator, and on the other hand with the depth measurements made by the perforating equipment. Under ordinary field conditions, very serious errors arise due to the stretching of cables, casing, and drill pipe, temperature changes, and mechanical and instrumental defects causing the depth indicating devices to show the wrong depth. In addition to these errors due to the nature of the equipment, it is known that there are many errors due to human causes, such as mistakes in counting the numbers of joints of drill pipe or casing. Because field crews frequently have to work very long hours, or late at night, they are predisposed to make errors of this nature.

In the past, attempts have been made to compare the depth measurements obtained in geophysical logging with drillers' or operators' measurements by determining the depth of the bottom of the hole by the two methods and noting the difference. This, however, has the disadvantage that the section of particular interest to the operators may be many thousands of feet above the bottom of the hole, and consequently the errors in comparing the two sets of measurements are nearly as large as would occur if the comparisons were made only at the surface. Furthermore, running the instruments to the bottom of the hole is expensive, time-consuming, difficult and may result in damage to the equipment. The bottom of the hole, moreover, does not remain at a fixed depth, but is apt to rise because of the accumulation of cavings, loose sand, the settling of mud, and tools which have fallen down the hole. In some cases an object wedged in the hole some distance above its base might be mistaken for the bottom. Therefore, an industrial need has been experienced for some method for removing these obstacles, thereby enabling operators to obtain accurate comparisons of measurements made by different methods, or at different times, and also permitting the depths at which a given geological or geophysical feature occurs to be marked so as to be sure that the exact spot may be detected again.

One important object of the present invention is to provide a method for the correlation of signals or geophysical data obtained from a prospecting instrument moved within a well with depth measurements made by counting joints of casing of known length.

The present invention, when regarded in certain of its broader aspects, comprises the provision of special marker casing units, preferably vertically spaced in the string when positioned within the well, that are capable of causing a significant reaction upon a geophysical prospecting device when the same is moved in the immediate vicinity of said units. These marker casing units can be spaced in the well at regular or irregular intervals, in either instance being readily recognizable on the geophysical log without danger of confusion with other data.

The presently preferred embodiment of the invention comprises the use of a radiation logging device in conjunction with casing units having associated therewith masses of radiation emissive material present in quantities such as to be detected easily by said device. The radiation emissive material can be associated with the selected marker casing units by being applied as a paint or can be retained within a removable plug or by other methods which will suggest themselves to those versed in this art.

An advantage of the method of depth measurement according to this invention over preexisting methods for similar purposes is that it is now possible to obtain a correlation between a well log and direct measurements of the casing length, thus compensating for errors in measurement due to cable stretch, without necessarily measuring or logging the entire depth of the well. This constitutes an advance over methods wherein the well bottom serves as a norm or base marker because it is now possible to restrict the prospecting to the locality of interest, which frequently is not near the bottom of the bore. Another advantage of this process is that it permits the operator to determine accurately the position of the bottom of the casing relative to the oil, water or gas bearing strata, with the result that it becomes possible to ascertain whether the bottom of the casing is located at the proper depth. For example, an operator may not known whether a mistake has been made in counting the number of joints of casing, and there is, therefore, uncertainty whether the water and gas shut offs are complete, and whether maximum production is being obtained from an oil sand. By marking the bottom of the casing with a radiation emitting substance, it is possible to secure an independent measurement of the depth of the bottom of the casing, and in addition to obtain this depth marked on a radiation log showing its relation to the fluid-yielding strata.

Industrial need for this new process is experienced especially where it is desirable to perforate casing and cement opposite thin reservoir rocks, strata producing oil or gas which lie close to the salt water table, and oil producing horizons which lie close to gas producing zones. Under such circumstances errors and discrepancies that commonly arise between well logs made by different methods would be likely to cause water or gas yielding strata to be perforated instead of the desired oil producing horizons. This danger can be eliminated by marking the important horizons with a radiation emissive substance at the time the original geophysical logs were made, thereby enabling these same horizons to be located without error by the perforating equipment.

A further advantage of this new process is that if desired the marking means associated with the casing units can comprise a substance possessing the desired properties only for a limited period of time, such as some artificially radioactive materials, which after a period will lose their qualities as a marker thereby returning the well to its normal or usual state.

Other advantages and features of the novel process of geophysical prospecting according to this invention will suggest themselves to those skilled in the art upon study of the invention.

To facilitate a better understanding of the invention and of its mode of application to problems encountered in geophysical prospecting, a representative procedure illustrated in the accompanying figures of drawing, will now be described, but it is clearly to be understood that this example of the practice of the instant invention is presented by way of suggestion merely and is not to be construed as a limitation upon either the invention or the subjoined claims.

Figure 2:
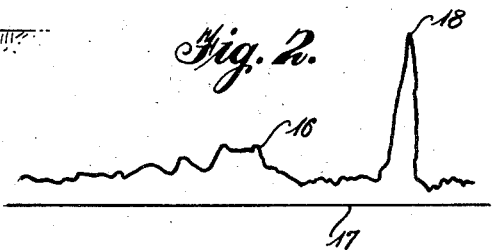
Figure 3:
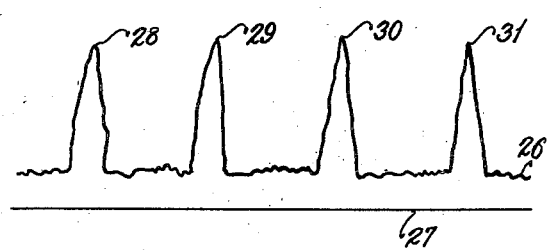
Figure 4:
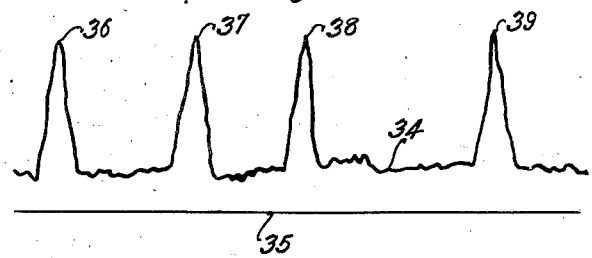

Referring to the drawing:

Figure 1 is essentially a vertical sectional view of a cased well bore showing a geophysical prospecting instrument positioned therein, Figure 2 is a diagrammatic illustration of a fragment of a typical well log obtained by surveying a cased well in accordance with this invention wherein a single marker is used, Figure 3 is a diagrammatic illustration of a fragment of a typical well log obtained by surveying a cased well in accordance with this invention wherein a plurality of regularly spaced markers are used, and Figure 4 is an illustration similar to Figures 2 and 3 wherein a plurality of irregularly spaced markers are employed.

Referring to Figure 1 of the accompanying drawing it is to be observed that a well bore 10 is illustrated within which is positioned a string of casing units 11. The casing units are of the conventional type, that is, the string consists of a plurality of tubular members interengaged at their ends to provide a continuous liquid tight sheath. A conventional geophysical prospecting instrument 12 is suspended within the cased well bore upon a cable 13 carried on a winch drum 14 and indications from the instrument are transmitted to appropriate analyzing and recording means 15 whereby a log is provided of indications from the instrument correlated with a record of its location within the well bore.

One or more of the units comprising the casing string 11 are provided with means for causing a significant indication in the prospecting instrument 12 when the same is moved into the immediate vicinity of these special marker casing units. In this particular instance the prospecting instrument employed is of the type sensitive to radiation and the selected marker casing units accordingly are provided with means for causing emission of radiation in readily detectable intensities. This is accomplished by associating with the selected casing units suitable quantities of radiation emissive material which can be applied by painting, use of plugs or inserts or by other methods within the expected skill of those familiar with this art. Among the naturally occurring radiation emissive substances suitable for this use are the ores and compounds of radium, thorium and uranium. Among the suitable artificially radiation emissive substances, which because of lower costs frequently are preferable to natural radioactive materials, are the alkali metals and salts thereof activated by exposure to hard electromagnetic rays or streams of particles of subatomic, particularly nuclear, dimensions. An additional advantage of the artificially radioactive materials over naturally radioactive substances is that the former usually emit radiation for but a short period whereas the effective life of some naturally radioactive substances may be thousands of years. A further advantage which makes the use of artificially radioactive substances preferable to the use of natural materials is that in some instances gamma rays of greater penetrating power are obtained thus permitting use of smaller quantities of material than would otherwise be necessary. Other sources of radiation include substances emitting neutron streams, such as mixtures of radon and beryllium, polonium and beryllium, or beryllium bombarded with gamma rays or particles of atomic dimensions accelerated artificially as by means of a cyclatron.

The preparation of additional materials which can be used as radiation sources is disclosed in U. S. Patent 2,206,634 granted July 2, 1940, to Fermi et al. Additionally, sources of α and β rays can be used, despite the limited range of these types of radiation, because of the comparative nearness of the detecting device to the surface of the casing units.

In Figure 2 a typical log fragment is illustrated indicating the type of log obtained when a single marker casing unit is used in accordance with this invention. The curve 16, corresponding in variation from the norm line 17 to signals from the geophysical prospecting instrument employed, includes a peak signal 18 due to the presence of the marker unit in the corresponding portion of the casing string. Correlation of the known depth at which the marker has been placed with the indications from the prospecting instrument permits accurate location of horizons of interest detected thereby.

In Figure 3 of the drawing a typical well log fragment obtained by practice of this invention using regularly spaced marker casing units is illustrated. It is to be noted that in general the signal curve 26 does not deviate greatly from the norm line 27 except for periodically recurring maxima 28, 29, 30 and 31. The maxima correspond in relative location to the positions occupied by the treated marker casing units which are provided with radiation emissive material, thus a single record is provided indicating variations in radiation emission of neighboring geological formations in correlation with indications of depth.

In Figure 4 the well log fragment illustrated is typical of that obtained when marker casing units are included in the string when run, at irregular but accurately located intervals. It will be noted that in this instance the signal curve 34 deviates widely from the norm line 35 at the maxima 36, 37, 38 and 39, thus indicating the presence, at these locations within the well, of the marker units.

It is to be understood that at the time of assembling the casing string within the well bore accurate measurements are made of the length of the individual casing units and of the positions occupied by the selected casing units carrying the radiation emissive material. Subsequent reference to these records in conjunction with the well log permits accurate determination of the depth at which the prospecting instrument is operating by location of the maxima corresponding to the marker casing units at known depths.

In practicing this invention it is usually desirable to use in the construction of the casing string a plurality of prepared casing units capable of affecting a geophysical instrument in the vicinity thereof, and to arrange these units in vertical spaced relationship whereby a series of reference maxima corresponding to known depths are indicated on the well log. However, as mentioned, it is also within the purview of this invention to use marker casing units in other arrangements than those indicated, for example, in some instances a single reference point near the base of the well may be sufficient, thus permitting use of but a single prepared casing unit.

I claim:

1. Method of geophysical prospecting that comprises positioning at preselected irregularly spaced locations within a well, casing units individually possessing radiation emissive characteristics capable of detection by a radiation sensitive prospecting instrument in the immediate vicinity thereof, and logging the well with a radiation sensitive prospecting instrument.

2. A method of geophysical prospecting that comprises positioning at preselected irregularly spaced locations within a well bore a plurality of casing units individually carrying temporarily radioactive material in readily detectable quantities and thereafter logging the well by a radioactivity well logging method.

WILLIAM L. RUSSELL.